No. 655,396. Patented Aug. 7, 1900.
H. FERNSTROM.
BEARING.
(Application filed Mar. 31, 1900.)
(No Model.) 2 Sheets—Sheet 2.
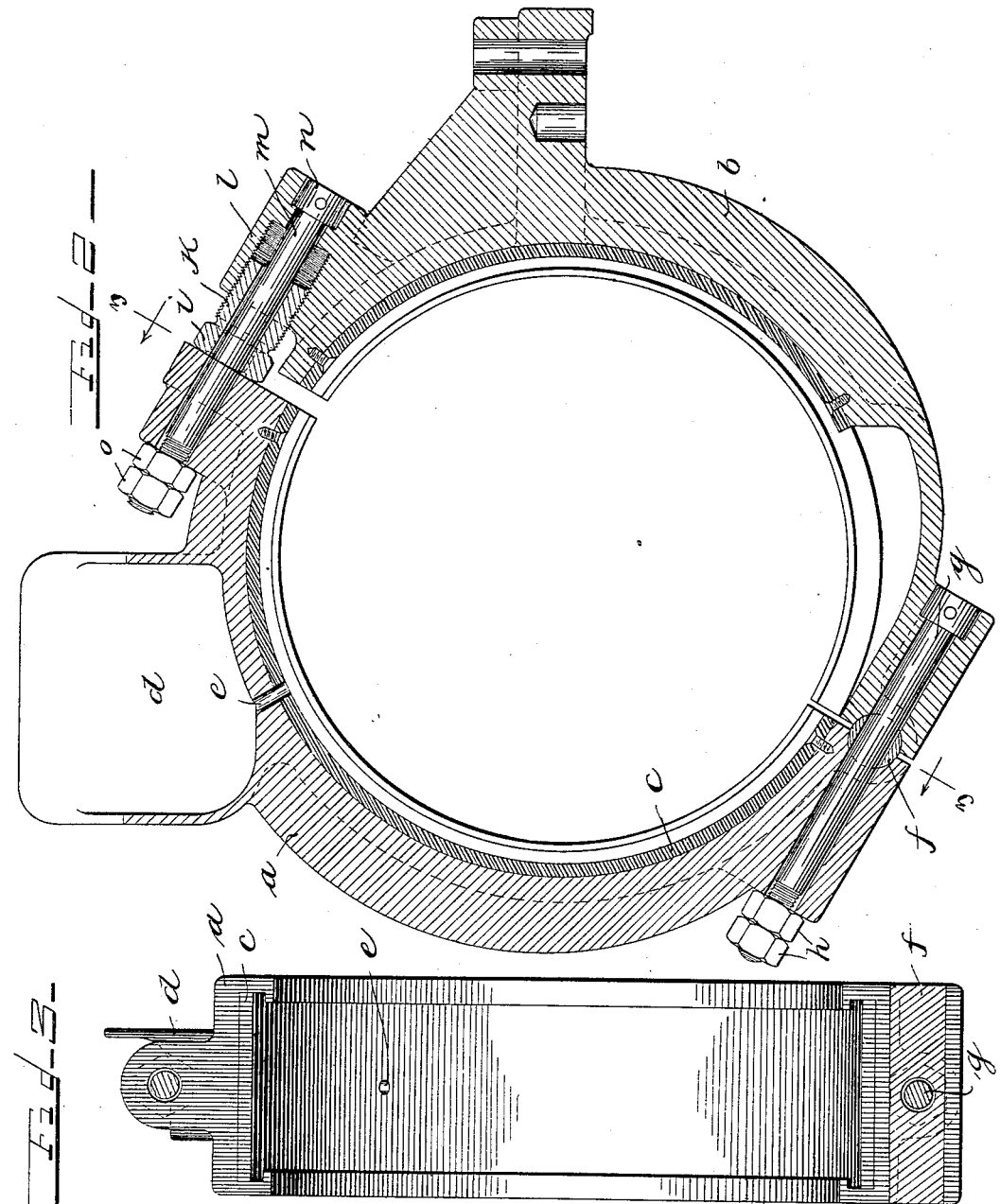

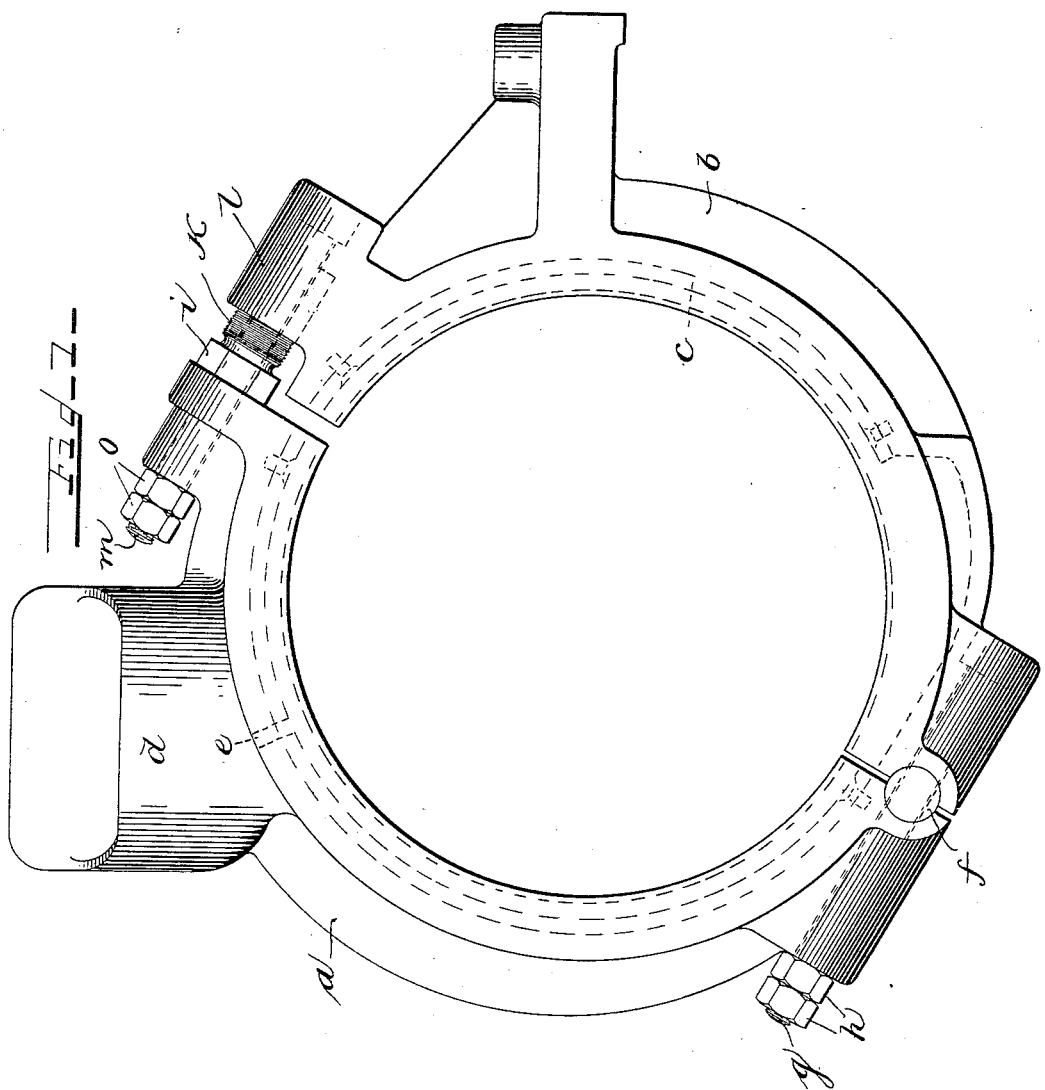

UNITED STATES PATENT OFFICE.

HERMAN FERNSTROM, OF SPRINGFIELD, ILLINOIS, ASSIGNOR TO A. L. IDE & SONS, OF SAME PLACE.

BEARING.

SPECIFICATION forming part of Letters Patent No. 655,396, dated August 7, 1900.

Application filed March 31, 1900. Serial No. 10,942. (No model.)

*To all whom it may concern:*

Be it known that I, HERMAN FERNSTROM, a citizen of the United States, residing at Springfield, in the county of Sangamon and State of Illinois, have invented a certain new and useful Improvement in Bearings, (Case No. 1,) of which the following is a full, clear, concise, and exact description, reference being had to the accompanying drawings, forming a part of this specification.

My invention relates to bearings, and more particularly to that class of bearings in which special adjusting devices are employed in place of liners for gaging the distance between halves or parts of the bearings, and has for its object the improvement in construction of bearings of this class.

In accordance with my invention I employ a threaded nut which is interposed between the bearing-sections for effecting the desired separation of these sections and a bolt engaging the sections of the bearing, serving to draw them in secure engagement with the separating-nut. In the preferred embodiment of my invention the separating-nut is in the form of a bushing, through which the stem of the clamping-bolt passes, the separating-nut having threaded engagement with one of the bearing-sections and being interposed between the bearing-sections, whereby the extent of its projection may be adjusted.

In the preferred embodiment of my invention the halves of the bearing are hinged together at one end, the free ends of the halves of the bearing being provided with my improved adjusting device. The ends of the bearing that have hinged connection are engaged with each other through the agency of a pin extending longitudinally of the bearing—that is, longitudinally of the axis of the rotating part inclosed by the bearing—to prevent radial displacement of the halves of the bearing, a transversely-acting clamping device, preferably a bolt, serving to prevent a transverse separation of the hinged ends of the halves of the bearing.

I will explain my invention more fully by reference to the accompanying drawings, in which—

Figure 1 is a side view of an eccentric-strap embodying the features of my invention. Fig. 2 is a longitudinal sectional view thereof. Fig. 3 is a sectional view on line 3 3 of Fig. 2.

Like parts are indicated by similar characters of reference throughout the different figures.

While I have shown my invention as applied to an eccentric-strap, I do not wish to be limited to this form of bearing.

The eccentric-strap is formed in two halves $a$ and $b$, containing linings of Babbitt metal $c$ and a pocket $d$ for the reception of lubricating material, a duct $e$ leading from the said pocket to the eccentric. The halves of the eccentric-strap $a$ and $b$ are engaged with each other through the agency of a journal, preferably in the form of a pin $f$, which is preferably cylindrical. This pin preferably engages two semicircular recesses, one in each half of the strap or bearing, thereby serving to prevent radial displacement of the halves or sections $a$ $b$. Transversely-acting clamping means, preferably in the form of a bolt $g$, serves to prevent transverse displacement of the sections $a$ and $b$, this clamping-bolt preferably passing through an aperture in pin $f$ and corresponding bores in sections $a$ and $b$, which aperture and bores are preferably of larger diameter than the stem of the bolt. Two nuts $h$ $h$ serve to effect and to secure the required transverse clamping engagement between the hinged sections of the bearing. The remaining ends of the halves or sections $a$ and $b$ are clamped together preferably by the particular means illustrated. A separating-nut is provided with a threaded extension $k$, engaging a corresponding threaded recess $l$ in the bearing-section $b$, this threaded recess passing only partially through a lug or projection carried by the portion $b$. Clamping means are provided for securing the free ends of the bearing-sections $a$ and $b$ in engagement with the separating-nut, this clamping means preferably being in the form of a bolt $m$, having a head $n$ engaging a corresponding recess provided in section $b$ and which is threaded at its opposite end to receive clamping-nuts $o$, the head $n$ and nuts $o$ serving to afford direct engagement between the clamping-bolt and the sections of the bearing. The free end of section $a$ is thus clamped directly against the nut $i$, the said nut being otherwise free of the section $a$ and carried upon the section $b$. The separating-nut $i$ and its stem $k$ are made hollow, a central bore passing through these parts of a slightly-larger diameter than the stem of the bolt. The bolt is passed through this bore. The stem $k$ thus forms an adjusting-screw in the shape of a sleeve, the head or nut $i$ forming a part of the adjusting-screw constituting the preferred means with which the adjusting-screw is provided to permit engagement therewith of a wrench for effecting the adjustment of the screw.

While I have shown a bearing having its halves united by a hinged connection and a clamping device, I do not wish to be limited to a construction wherein a single separating-nut enters into the construction, nor do I wish to be limited to the application of my invention to an eccentric-strap, nor do I wish to be limited to the precise details of construction shown, as modifications may readily be made without departing from the spirit of my invention; but,

Having thus described my invention, I claim as new and desire to secure by Letters Patent—

1. The combination with the united sections of a bearing, of a separating-screw interposed between ends of said sections and being adapted for access and engagement between the said ends, whereby it may be rotated to effect its required adjustment, and clamping means for securing the ends of the bearing-sections in fixed engagement with the said screw, substantially as described.

2. The combination with the united sections of a bearing, of a separating-screw interposed between ends of said sections and being adapted for access and engagement between the said ends, whereby it may be rotated to effect its required adjustment, said screw having threaded engagement with one of said sections only, and clamping means for securing the ends of the bearing-sections in fixed engagement with the said screw, substantially as described.

3. The combination with the united sections of a bearing, of a separating-screw interposed between ends of said sections and being adapted for access and engagement between the said ends, whereby it may be rotated to effect its required adjustment, and a bolt for clamping the sections into engagement with the said screw, substantially as described.

4. The combination with the united sections of a bearing, of a separating-screw interposed between ends of said sections and being adapted for access and engagement between the said ends, whereby it may be rotated to effect its required adjustment, said screw having threaded engagement with one of said sections only, and a bolt for clamping the sections into engagement with the said screw, substantially as described.

5. The combination with the united sections of a bearing, of a separating-screw interposed between ends of said sections and being adapted for access and engagement between the said ends, whereby it may be rotated to effect its required adjustment, said screw being provided with a bore and a bolt passing through the bore in said screw and directly engaging the ends of the sections between which the separating-screw is interposed, substantially as described.

6. The combination with the united sections of a bearing, of a separating-screw interposed between ends of said sections and being adapted for access and engagement between the said ends, whereby it may be rotated to effect its required adjustment, said screw having threaded engagement with one of said sections only, and being provided with a bore and a bolt passing through the bore in said screw and directly engaging the ends of the sections between which the separating-screw is interposed, substantially as described.

7. The combination with the united sections of a bearing, of a separating-screw interposed between ends of said sections, said separating-screw being provided with a nut $i$ located between the said sections, whereby the screw may be rotated to effect its adjustment, and clamping means for securing the ends of the bearing-sections in fixed engagement with the said screw, substantially as described.

8. The combination with the united sections of a bearing, of a separating-screw interposed between ends of said sections, said separating-screw being provided with a nut $i$ located between the said sections, whereby the screw may be rotated to effect its adjustment, the said screw having threaded engagement with one of the sections and being carried with its nut solely by said section, and clamping means for securing the ends of the bearing-sections in fixed engagement with the said screw, substantially as described.

9. The combination with the united sections of a bearing, of a separating-screw interposed between ends of said sections, said separating-screw being provided with a nut $i$ located between the said sections, whereby the screw may be rotated to effect its adjustment, said screw and nut having a bore passing through the same, and a clamping-bolt passing through said bore and having direct engagement with the bearing-sections, substantially as described.

10. The combination with the united sections of a bearing, of a separating-screw interposed between ends of said sections, said separating-screw being provided with a nut $i$ located between the said sections, whereby the screw may be rotated to effect its adjustment, said screw and nut having a bore passing through the same, and said screw having threaded engagement with one of the sections and being carried with its nut solely by said section, and a clamping-bolt passing through said bore and having direct engagement with the bearing-sections, substantially as described.

11. The combination with the hinged sections of a bearing of a separating-screw interposed between ends of said sections and being adapted for access and engagement between the said ends, whereby it may be rotated to effect its required adjustment, and clamping means for securing the ends of the bearing-sections in fixed engagement with the said screw, substantially as described.

12. The combination with the hinged sections of a bearing, of a separating-screw interposed between ends of said sections, said separating-screw being provided with a nut *i* located between the said sections, whereby the screw may be rotated to effect its adjustment, and clamping means for securing the ends of the bearing-sections in fixed engagement with the said screw, substantially as described.

13. The combination with the hinged sections of a bearing, of a separating-screw interposed between ends of said sections, said separating-screw being provided with a nut *i* located between the said sections, whereby the screw may be rotated to effect its adjustment, said screw and nut having a bore passing through the same, and said screw having threaded engagement with one of the sections and being carried with its nut solely by said section, and a clamping-bolt passing through said bore and having direct engagement with the bearing-sections, substantially as described.

14. In a bearing, the combination with the sections thereof, of a pin extending longitudinally thereof for preventing radial displacement of the said sections, and transversely-acting clamping means to prevent transverse displacement of the bearing-sections, substantially as described.

15. In a bearing, the combination with the sections thereof, of a cylindrical pin extending longitudinally thereof for preventing radial displacement of the said sections, said pin engaging corresponding recesses at the hinged ends of the sections, the pin being provided with a transverse passage, and a clamping-bolt, engaging the hinged ends of the sections, passing through said transverse opening and serving to prevent transverse displacement of the hinged ends of the bearing-sections, substantially as described.

16. In a bearing, the combination with the hinged sections thereof, of a journal serving to prevent radial displacement of the said sections, and transversely-acting clamping means to prevent transverse displacement of the bearing-sections, substantially as described.

17. In a bearing, the combination with the hinged sections thereof, of means for preventing radial displacement of the said sections, and transversely-acting clamping means to prevent transverse displacement of the bearing-sections, substantially as described.

In witness whereof I hereunto subscribe my name this 27th day of March, A. D. 1900.

HERMAN FERNSTROM.

Witnesses:
  T. P. LUBY,
  ADA L. AYERS.